(12) United States Patent
Huang et al.

(10) Patent No.: US 11,668,526 B2
(45) Date of Patent: Jun. 6, 2023

(54) CONTINUOUS HORIZONTAL-FEEDING PREHEATING DEVICE AND PREHEATING ENHANCEMENT METHOD THEREOF

(71) Applicants: CISDI ENGINEERING CO., LTD, Chongqing (CN); CISDI RESEARCH AND DEVELOPMENT CO., LTD., Chongqing (CN)

(72) Inventors: Qiming Huang, Chongqing (CN); Cunzhen Tan, Chongqing (CN); Weizhi Shi, Chongqing (CN); Yuchuan Zhang, Chongqing (CN); Zhan Gao, Chongqing (CN); Lei Al, Chongqing (CN); Chunting Liu, Chongqing (CN); Wei Lin, Chongqing (CN); Chao Liu, Chongqing (CN)

(73) Assignees: CISDI ENGINEERING CO., LTD, Chongqing (CN); CISDI RESEARCH AND DEVELOPMENT CO., LTD., Chongqing (CN)

( * ) Notice: Subject to any disclaimer, the term of this patent is extended or adjusted under 35 U.S.C. 154(b) by 567 days.

(21) Appl. No.: 16/649,966

(22) PCT Filed: Aug. 28, 2018

(86) PCT No.: PCT/CN2018/102726
§ 371 (c)(1),
(2) Date: Mar. 23, 2020

(87) PCT Pub. No.: WO2019/056930
PCT Pub. Date: Mar. 28, 2019

(65) Prior Publication Data
US 2020/0224972 A1 Jul. 16, 2020

(30) Foreign Application Priority Data
Sep. 22, 2017 (CN) .......................... 201710867653.3

(51) Int. Cl.
*F27B 3/08* (2006.01)
*F27D 13/00* (2006.01)
(Continued)

(52) U.S. Cl.
CPC ............ *F27B 3/085* (2013.01); *F27D 13/002* (2013.01); *F27B 3/205* (2013.01); *F27B 3/28* (2013.01);
(Continued)

(58) Field of Classification Search
CPC ....... C21C 5/52; C21C 5/5217; C21C 5/5241; C21C 5/5252; C21C 5/527; C21C 5/5294;
(Continued)

(56) References Cited

U.S. PATENT DOCUMENTS 798,258 A * 8/1905 Benjamin ............. F27D 13/002
373/80
5,889,810 A * 3/1999 Katayama ................. F27B 3/18
373/80
(Continued)

FOREIGN PATENT DOCUMENTS

WO WO-2011091685 A1 * 8/2011 ............. C21C 5/565

*Primary Examiner* — Hung D Nguyen
(74) *Attorney, Agent, or Firm* — Michael D. Eisenberg

(57) ABSTRACT

The present invention belongs to the technical field of metallurgy, and discloses a horizontal continuous feeding preheating device and an enhanced preheating method therefor. The scheme comprises that two dust removal ports are arranged at the front and rear parts of a horizontal continuous feeding preheating duct, and the horizontal continuous feeding preheating duct is divided into an enhanced preheating area and a flue gas preheating area by the two dust removal ports arranged at the front and rear parts of the horizontal continuous feeding preheating duct; burners are installed in the enhanced preheating area, and the two dust removal ports are connected with a flue gas adjusting (Continued)

distributor respectively by a flue gas pipeline the steel scrap preheating efficiency of the burners and electric arc furnace flue gas is increased by controlling the flow rate and temperature of mixed flue gas.

5 Claims, 1 Drawing Sheet

(51) Int. Cl.
    *F27B 3/20*     (2006.01)
    *F27B 3/28*     (2006.01)
    *F27D 17/00*     (2006.01)
    *F27D 99/00*     (2010.01)

(52) U.S. Cl.
    CPC ........ *F27D 17/003* (2013.01); *F27D 99/0033* (2013.01)

(58) Field of Classification Search
    CPC .......... C21C 5/56; C21C 5/565; C21C 5/567; F27D 13/00; F27D 13/002; F27D 17/001; F27D 17/002; F27D 17/003; F27D 17/004; F27D 17/008; F27D 99/00; F27D 99/0033; F27B 3/065; F27B 3/085; F27B 3/12; F27B 3/18; F27B 3/183; F27B 3/186; F27B 3/19; F27B 3/205; F27B 3/26; F27B 3/28
    USPC ............................................ 373/8, 9, 79, 80
    See application file for complete search history.

(56) References Cited

U.S. PATENT DOCUMENTS 6,155,333 A * 12/2000 Vallomy ................. C21C 5/527
    164/476
2015/0153107 A1* 6/2015 Giavani ................ F27D 3/0025
    432/9

* cited by examiner

CONTINUOUS HORIZONTAL-FEEDING PREHEATING DEVICE AND PREHEATING ENHANCEMENT METHOD THEREOF

TECHNICAL FIELD

The present invention belongs to the technical field of metallurgy, and particularly relates to a horizontal continuous feeding preheating device and an enhanced preheating method therefor.

BACKGROUND

In electric arc furnace steel making, energy saving, consumption reduction, environmental protection and automation are always core in the development of electric arc furnace steel making technology.

A steel scrap preheating electric arc furnace is an energy-saving electric arc furnace, the technologies of preheating steel scrap with flue gas in an electric arc furnace, which emerged in the 1980s, are typical energy saving technologies, and a typical representative is CONSTEEL (U.S. Pat. No. 5,400,358). After nearly 30 years of development, the CONSTEEL technology has been relatively mature; and the flat molten pool smelting thereof reduces the impact on power grid, has the advantage of reducing the maintenance of electric furnace body, and has certain energy-saving effect in actual production. However, CONSTEEL has also shown some disadvantages during use, such as lower power-saving effect than that of a shaft furnace. With American shale gas revolution, the price of bottom carbon chemical energy such as oil and natural gas has decreased, and the introduction of external chemical energy into CONSTEEL has become an economical method. By adding chemical energy to a conveyor belt, the steel scrap preheating efficiency of the existing CONSTEEL can be increased, and similar ideas are reflected in the CONSTEEL improvement, CN103003453B, CN104583700A and other patent applications. A traditional CONSTEEL flue is provided with nozzles or burners, which is also reflected in U.S. Pat. No. 5,400,358. However, as a preheating duct of the traditional CONSTEEL is also a total flue gas passage which has a large area and a large height, the heat exchange between burner gas and steel scrap is insufficient, and the thermal efficiency is low.

SUMMARY

In view of this, the purpose of the present invention is to provide a horizontal continuous feeding preheating device and an enhanced preheating method therefor, which is to add chemical energy based on the traditional CONSTEEL, and reduce the mixing amount of cold air by dividing flue gas flow rate and optimizing flue gas flow direction, so as to obtain higher chemical energy thermal efficiency.

To achieve the above purpose, the present invention provides the following technical solution: a horizontal continuous feeding preheating device, comprising a horizontal continuous feeding preheating duct and an electric arc furnace, wherein the horizontal continuous feeding preheating duct is provided with a first dust removal port and a second dust removal port at an interval along the material conveying direction, the first dust removal port is located behind a sealed feed inlet of the horizontal continuous feeding preheating duct and close to the sealed feed inlet, the second dust removal port is located at a rear section of the horizontal continuous feeding preheating duct and close to the feed inlet of the electric arc furnace, a first preheating area is formed by the horizontal continuous feeding preheating duct between the two dust removal ports, and a second preheating area is formed by the horizontal continuous feeding preheating duct between the second dust removal port and the feed inlet of the electric arc furnace; and also comprising a plurality of burners obliquely arranged at intervals in the first preheating area of the horizontal continuous feeding preheating duct, and the horizontal component direction of the combustion gas flow of each burner is opposite to the material conveying direction.

Further, the duct height of the first preheating area of the horizontal continuous feeding preheating duct is less than that of the second preheating area.

Further, the second preheating area of the horizontal continuous feeding preheating duct is obliquely provided with a plurality of burners at intervals, and the horizontal component direction of the combustion gas flow of each burner is opposite to the material conveying direction.

Further, the first dust removal port is connected with a mixed flue gas pipeline, and the second dust removal port is connected with a hot flue gas pipeline; and both the mixed flue gas pipeline and the hot flue gas pipeline are connected with a settling chamber.

Further, the mixed flue gas pipeline and the hot flue gas pipeline are connected with the settling chamber by a flue gas adjusting distributor and a flue.

Further, both the mixed flue gas pipeline and the hot flue gas pipeline are provided with control valves; and the mixed flue gas pipeline and the hot flue gas pipeline are connected with the settling chamber by the flue.

Further, the device also comprises a flue gas quench device connected with the settling chamber.

Further, the device also comprises a steel scrap feeding magnetic disk crane, and material is conveyed to the material receiving section of the horizontal continuous feeding preheating duct by the steel scrap feeding magnetic disk crane or a vibrating feeding device.

An enhanced preheating method based on the above horizontal continuous feeding preheating device, comprising that the material in the second preheating area is preheated by the total flue gas discharged from the electric arc furnace; the total flue gas is divided into a first branch of flue gas and a second branch of flue gas by the first dust removal port and the second dust removal port arranged at intervals, the first branch of flue gas is extracted by the second dust removal port, and the material in the first preheating area is preheated by the second branch of flue gas when the second branch of flue gas passes through the first preheating area; the first preheating area is provided with the burners injecting combustion gas into the first preheating area, and the second branch of flue gas is driven by the flame efflux of the burners to penetrate gaps of a material layer together; and the cold air, combustion gas and second branch of flue gas entering from the sealed feed inlet are extracted by the first dust removal port.

Further, the distribution ratio of flue gas flowing through the mixed flue gas pipeline and the hot flue gas pipeline is adjusted by adjusting the flue gas adjusting distributor or the control valves respectively, so as to control the flow rates of the first branch of flue gas and the second branch of flue gas and the temperature of the mixed flue gas entering the mixed flue gas pipeline.

The present invention has the following beneficial effects:

1. Due to the dividing and guiding effects of the two dust removal ports on electric arc furnace flue gas, the flue gas flow direction and duct structure of the traditional CONSTEEL are changed, most of the flue gas is removed by the second dust removal port close to the electric arc furnace, the volume of the flue gas in an enhanced preheating area is reduced, the height of the duct can be designed according to the mixture of burner combustion gas and electric arc furnace gas and the requirement of fluid dynamic pressure balance, and a steel scrap layer in the enhanced preheating area can be directly impacted by the flame efflux of the burners; at the same time, the branches of flue gas is driven by the flame efflux to penetrate the gaps of the steel scrap layer, so that the heat exchange effect of the branches of flue gas is improved, and the combustion thermal efficiency of the burners is greatly increased.

2. As the traditional CONSTEEL is provided with only one dust removal port at the end part, the duct needs to provide a passage with a large flue gas volume, therefore optimization cannot be achieved, and the steel scrap preheating efficiency of the burners is relatively low. Compared with the traditional CONSTEEL, the flue gas dividing technology of the present invention optimizes the duct height of CONSTEEL, so that steel scrap can be heated directly by the original burners in the enhanced preheating area, thereby increasing the efficiency of external chemical energy, and enhancing the preheating effect of external chemical energy.

3. In the present invention, the passage for cold air to enter the enhanced preheating area is cut off by the first dust removal port, steel scrap can be heated directly by the burners in the enhanced preheating area, and the enhanced preheating area is filled with high-temperature flue gas, so that the thermal efficiency of the burners is greatly increased.

4. As the burners are inclined towards the first dust removal port and the combustion gas flow is opposite to the dust removal port, an injection pump effect is produced by the efflux horizontal component of a plurality rows of burners and the narrow steel scrap duct, and a dynamic pressure driving gas to flow to the first dust removal port is generated in the duct of the first preheating area; and the two flue gas dust removal ports are connected with the flue gas adjusting distributor respectively by a flue gas pipeline, so that the distribution ratio of flue gas of the first dust removal port and the second dust removal port is adjusted by the flue gas adjusting distributor respectively, which has great significance.

5. The temperature of the mixed flue gas can be controlled in order to inhibit the emission of dioxin in steel scrap preheating process.

BRIEF DESCRIPTION OF THE DRAWINGS

To enable the purpose, the technical solution and the beneficial effects of the present invention to be more clear, the present invention provides the following drawings for explanation.

REFERENCE SIGNS

Figure 1:
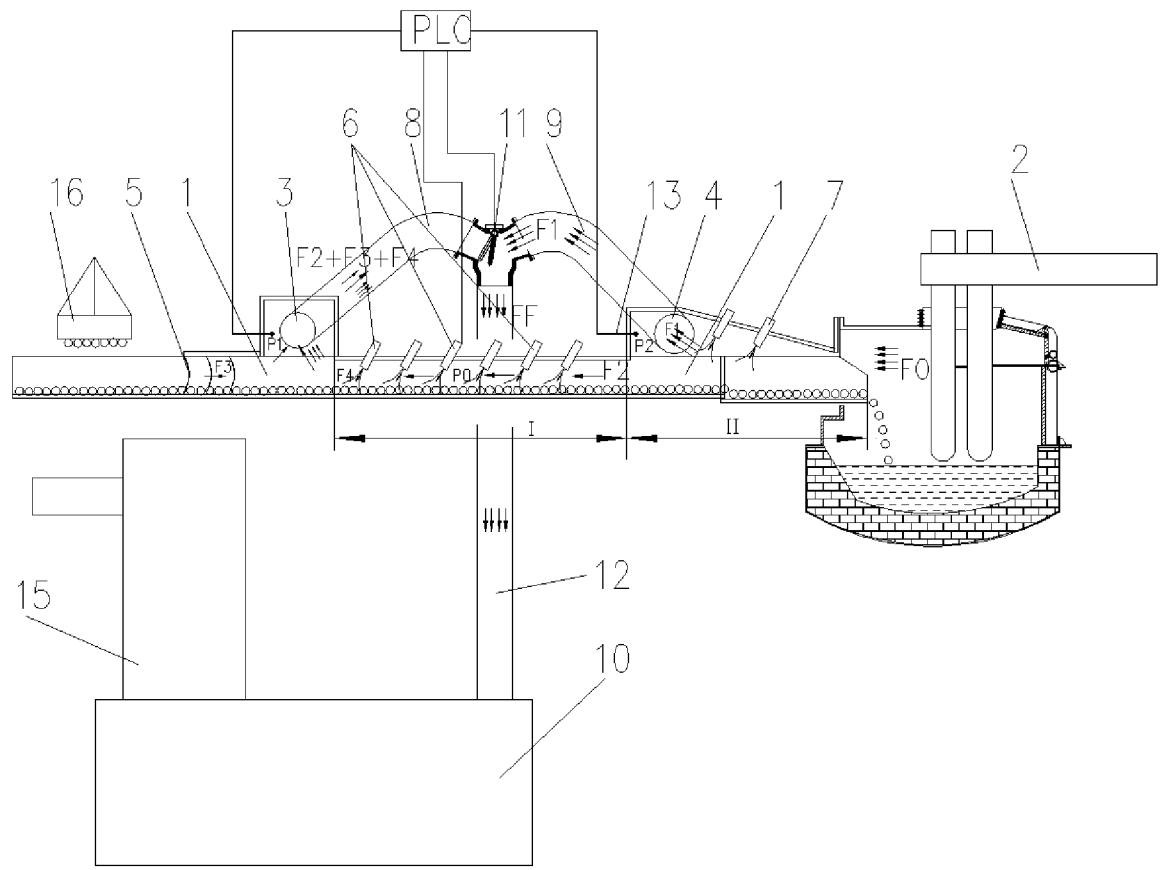
FIG. 1 is a system schematic diagram of the present invention.
Figure 2:
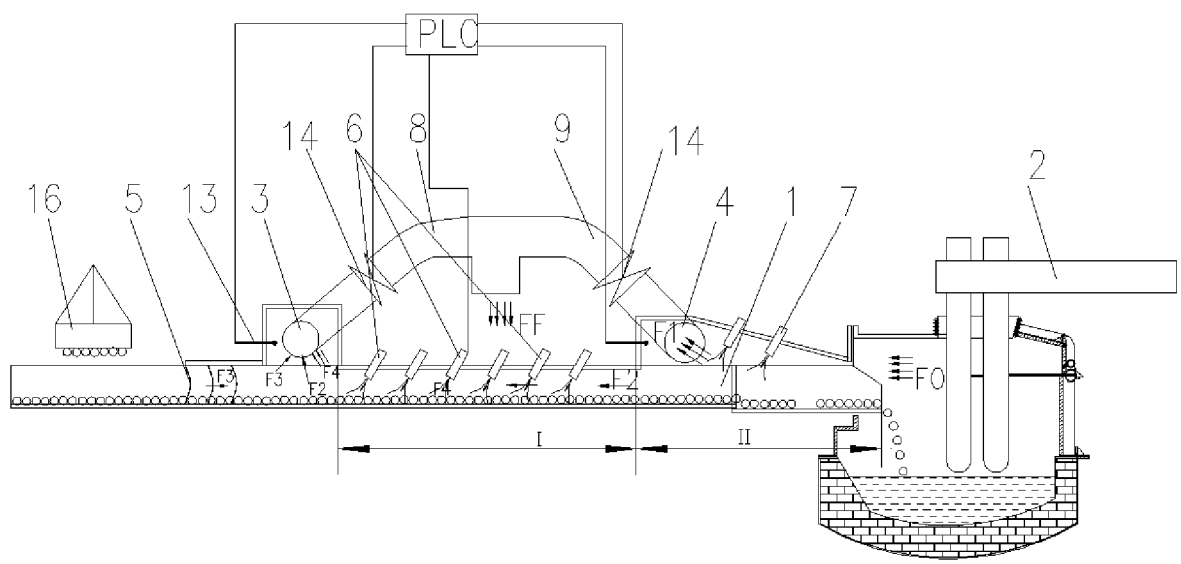
FIG. 2 is a schematic diagram of a deformed structure in FIG. 1.

Horizontal continuous feeding preheating duct 1, electric arc furnace 2, first dust removal port 3, second dust removal port 4, sealed feed inlet 5, burner 6, burner 7, mixed flue gas pipeline 8, hot flue gas pipeline 9, settling chamber 10, flue gas adjusting distributor 11, flue 12, flue gas pressure sensor 13, control valve 14, flue gas quench device 15, steel scrap feeding magnetic disk crane 16;

F0: Total flue gas discharged from the electric arc furnace;
F1: First branch of flue gas flowing to the second dust removal port;
F2: Second branch of flue gas flowing to the first dust removal port;
F3: Cold air entering the first preheating area from the sealed feed inlet;
F4: Combustion gas injected by the burners;
FF: Mixed gas of F1, F2, F3 and F4;
P0: Fluid driving pressure generated in the duct of the first preheating area;
P1: Negative pressure of the first dust removal port;
P2: Negative pressure of the second dust removal port.

DETAILED DESCRIPTION

Preferred embodiments of the present invention will be described below in detail in combination with drawings.

As shown in the figures, the horizontal continuous feeding preheating device in the present invention comprises a horizontal continuous feeding preheating duct 1 and an electric arc furnace 2, wherein the horizontal continuous feeding preheating duct 1 is provided with a first dust removal port 3 and a second dust removal port 4 at an interval along the material conveying direction, the first dust removal port 3 is located behind a sealed feed inlet 5 of the horizontal continuous feeding preheating duct 1 and close to the sealed feed inlet 5, the second dust removal port 4 is located at a rear section of the horizontal continuous feeding preheating duct 1 and close to the feed inlet of the electric arc furnace 2, a first preheating area is formed by the horizontal continuous feeding preheating duct between the two dust removal ports, and a second preheating area is formed by the horizontal continuous feeding preheating duct between the second dust removal port 4 and the feed inlet of the electric arc furnace; and also comprises a plurality of burners 6 obliquely arranged at intervals in the first preheating area of the horizontal continuous feeding preheating duct 1, and the horizontal component direction of the combustion gas flow of each burner 6 is opposite to the material conveying direction.

In the present invention, due to the dividing effect of the two dust removal ports on the total flue gas F0 discharged from the electric arc furnace, the flue gas flow direction of the traditional CONSTEEL is changed. The first branch of flue gas F1 (most of the electric arc flue gas) is removed by the second dust removal port 4 close to the feed inlet of the electric arc furnace, and the material in this area is mainly preheated by the flue gas, therefore this area can also be called a flue gas preheating area; the second branch of flue gas F2 (rest of the electric arc flue gas) flows through the first preheating area and preheats the material in this area, and flames are injected by the burners 6 obliquely arranged in this area to preheat the material in this area together with the second branch of flue gas F2 flowing through this area, therefore this area can also be called an enhanced preheating area. The efflux horizontal component of the obliquely arranged burners 6 is directed to the first dust removal port and is opposite to the second dust removal port (i.e. the direction of the efflux horizontal component is opposite to the material conveying direction), so that the steel scrap layer in the enhanced preheating area can be directly impacted by the flame efflux of the burners 6; at the same time, the branches of flue gas is driven by the flame efflux to penetrate the gaps of the steel scrap layer, so that the heat exchange effect of the branches of flue gas is improved, and the combustion thermal efficiency of the burners 6 is greatly increased. In addition, the passage for cold air to enter the enhanced preheating area can be cut off by the first dust removal port 3 arranged behind the sealed feed inlet 5, steel scrap can be heated directly by the burners in the enhanced preheating area, and the enhanced preheating area is filled with high-temperature flue gas, so that the thermal efficiency of the burners 6 is further increased.

In the present invention, the duct height of the first preheating area of the horizontal continuous feeding preheating duct 1 is less than that of the second preheating area. Due to the dividing effect of the two dust removal ports on the total flue gas F0 discharged from the electric arc furnace, the volume of the flue gas in the enhanced preheating area is reduced, the height of the duct can be redesigned according to the mixed flue gas (the burner combustion gas F4+the second branch of flue gas F2) and the requirement of fluid dynamic pressure balance. That is to say, in the present invention which adopts the flue gas dividing technology, steel scrap can be heated directly by the burners 6 in the enhanced preheating area by reducing the duct height of the first preheating area, thereby increasing the efficiency of external chemical energy, and enhancing the preheating effect of external chemical energy.

In the present invention, the second preheating area of the horizontal continuous feeding preheating duct 1 is obliquely provided with a plurality of burners 7 at intervals, and the horizontal component direction of the combustion gas flow of each burner 7 is opposite to the material conveying direction. By adding the burners 7, the preheating effect of the material in the second preheating area can be further improved in a limited preheating time.

In the present invention, the first dust removal port 3 is connected with a mixed flue gas pipeline 8, and the second dust removal port 4 is connected with a hot flue gas pipeline 9; and both the mixed flue gas pipeline 8 and the hot flue gas pipeline 9 are connected with a settling chamber 10.

Specifically, in the embodiment, both the first dust removal port 3 and the second dust removal port 4 are provided with flue gas pressure sensors 13, both the mixed flue gas pipeline 8 and the hot flue gas pipeline 9 are connected with a flue 12 by a flue gas adjusting distributor 11, and the flue 12 is then connected with the settling chamber 10. In order to ensure the dust removal effect for the whole electric arc furnace 2, it is necessary to ensure that the second dust removal port 4 has sufficient air extraction capacity (negative pressure); if the enhanced preheating area is not partitioned by the first dust removal port 3, a large amount of cold air will first enter the enhanced preheating area and then continue to enter the second dust removal port 4, so that the burners 6 have to heat this part of cold air, causing the thermal efficiency thereof to be reduced. As the burners 6 are inclined towards the first dust removal port and the direction of the efflux horizontal component thereof is opposite to the material conveying direction, an injection pump effect is produced by the plurality rows of burners 6 and the narrow preheating duct, and a force driving gas to flow to the first dust removal port is generated in the enhanced preheating area, i.e. a fluid dynamic pressure is generated; and the dust removal negative pressure of the second dust removal port 4 can be balanced by the fluid dynamic pressure, so that the micro-negative pressure of the first dust removal port is realized. With the distribution ratio of flue gas of the first dust removal port 3 and the second dust removal port 4 being adjusted by the flue gas adjusting distributor 11, the amount of cold air flowing into the sealed feed inlet is minimized and is even close to 0, so that the thermal efficiency of the whole horizontal feeding preheating system is integrally increased. In addition, the heat of the horizontal continuous feeding preheating duct 1 lost by cooling can be complemented by the second branch of flue gas F2 entering the enhanced preheating area, and therefore the thermal efficiency of the gas for scrap steel preheating in the preheating area can be increased. It should be noted that the flue gas adjusting distributor 11 in the present invention can be a three-way flap valve or any other flue gas adjusting device.

As an alternative scheme of the above embodiment, the flue gas adjusting distributor 11 can be cancelled, and control valves 14 can be directly and correspondingly arranged on the mixed flue gas pipeline 8 and the hot flue gas pipeline 9; and then the mixed flue gas pipeline 8 and the hot flue gas pipeline 9 are directly connected with the flue, i.e. the resistance on the mixed flue gas pipeline 8 and the hot flue gas pipeline 9 is adjusted by the control valves 14.

The present invention also comprises a flue gas quench device 15 connected with the settling chamber 10 so as to cool the flue gas.

The present invention also comprises a steel scrap feeding magnetic disk crane 16, and steel scrap is put to the material receiving section of the horizontal continuous feeding preheating duct 1 by the steel scrap feeding magnetic disk crane 16. Of course, a vibrating feeding device can be added in front of the material receiving section of the horizontal continuous feeding preheating duct, steel scrap is put into the vibrating feeding device by the steel scrap feeding magnetic disk crane 16, and the vibrating feeding device can be used as a temporary storage bin which can continuously feed material to the material receiving section of the horizontal continuous feeding preheating duct.

As mentioned above, in order to ensure the dust removal effect for the electric arc furnace 2, the second dust removal port 4 which serves as the main dust removal port shall not only extract the first branch of flue gas F1, but also ensure a certain negative pressure P2 of the second dust removal port 4. The second branch of flue gas F2 enters the duct of the first preheating area; the plurality rows of downward inclined burners 6 are installed in the first preheating area, an injection pump effect is produced by the efflux horizontal component of each burner 6 and this section of duct (a multistage injection pump for the plurality rows of burners 6), so that the fluid driving pressure P0 (fluid dynamic pressure) generated in the duct of the first preheating area is enhanced, and the negative pressure P2 of the second dust removal port 4 can be balanced (P0=P2), partially balanced (P0<P2) or overbalanced (P0>P2) by the fluid driving pressure P0. Of course, the first dust removal port 3 may also have a certain negative pressure P1 to cut off the cold air F3 so that the cold air will not enter the enhanced preheating area; the cold air F3, the combustion gas F4 injected by the burners and the second branch of flue gas F2 are extracted by the first dust removal port 3, and the distribution ratio of F1 and F2 is controlled by the pressure sensors 13 of the two dust removal ports, so as to adjust the resistance on the mixed flue gas pipeline 8 and the hot flue gas pipeline 9 and achieve the optimum balance of the flue gas in the horizontal continuous feeding preheating duct 1.

Several working conditions of the system in preheating process will be analyzed and explained below:

Condition 1: If P0=P2, i.e. the gas injection driving force in the first preheating area is close to the negative pressure of the second dust removal port 4, then the negative pressure of the first dust removal port is P1≈0, the second branch of flue gas in the first preheating area can be F2=0, and only a small amount of cold air F3 and combustion gas F4 injected by the burners enter the first dust removal port 3; however, it is difficult to realize system control in this condition.

Condition 2: If P0>P2, i.e. the second branch of flue gas F2 in the first preheating area and the combustion gas F4 injected by the burners enter the first dust removal port 3 actively, then P1 shall be a micro-negative pressure; otherwise, flue gas will be emitted from the feed inlet. As P1 is a micro-negative pressure, the cold air F3 passing through the sealed feed inlet 5 is relatively less, the second branch of flue gas F2 is relatively more, and steel scrap can be preheated by the second branch of flue gas F2 and the combustion gas F4 injected by the burners.

Condition 3: If P0<P2, P1>P2−P0, and P1 is a certain negative pressure, then a certain amount of cold air F3 will be mixed into the first preheating area, but the amount is far less than that when P0≤0; the amount of total flue gas F2+F3+F4 extracted by the first dust removal port is relatively less, and steel scrap can be preheated by the second branch of flue gas F2 and the combustion gas F4.

Condition 2 and condition 3 are the basic working modes of the system; in both conditions, PLC can be adjusted by the pressure sensors 13 of the two dust removal ports, and the flue gas adjusting distributor 11, the burners 6 and the burners 7 are controlled by PLC to ultimately adjust the distribution ratio of F1 and F2.

It should be emphasized that the efflux slope direction of the burners 6 in the first preheating area is very important, as the efflux slope direction determines whether P0 has a balancing or enhancing effect on P2. In the present invention, if P0 is too high, causing P0>P2, then the second branch of flue gas F2 can be extracted by the first dust removal port 3, and the flue gas adjusting distributor 11 is essentially used for adjusting the distribution ratio of P1 and P2 in order to make the system reach the optimum balance of "gas dynamic force-dust removal static force" under the control of PLC, realize the dynamic sealing of the system, and increase the thermal efficiency of the first preheating area, which is the significance of the existence of the first dust removal port 3. In the horizontal continuous feeding preheating duct 1, the steel scrap first passes through the enhanced preheating area, and then enters the flue gas preheating area; as the flue gas temperature at the feed inlet of the electric arc furnace is relatively high, the steel scrap can be further preheated.

As can be seen from the above explanation: this system is characterized in that the amount of cold air F3 mixed into the horizontal continuous feeding preheating duct 1 is greatly reduced.

In addition, it should be noted that the flue gas flow direction in the first preheating area is opposite to the steel scrap material flow direction, and the preheating of steel scrap is enhanced by the chemical energy of the burners 6, which is beneficial to increasing the heat exchange efficiency. Reducing the mixing amount of cold air F3 is helpful to increasing the thermal efficiency of the input chemical energy.

Assume that the cold air mixed into the first preheating area is F3=5000 m$^3$/h (for traditional consteel 75tEAF, the flow rate of the gas entering the preheating flue is 40000-60000 m$^3$/h, taking 1/10), and the temperature is 40° C.;

The combustion gas of the first preheating area is F4=12500 m$^3$/h (equivalent to 75tEAF consuming 10 Nm$^3$/t of natural gas during air combustion in the first preheating area), and the combustion temperature is controlled at about 1200° C.;

For the convenience of evaluation, the specific heat of each gas is assumed to be the same, and the thermal efficiency of the device itself is unchanged;

Then the temperature of the mixed cold and hot gas in the first preheating area is about 868° C.;

The temperature of the mixed flue gas discharged after preheating the steel scrap in the first preheating area is about 600° C.;

The thermal equivalent is: (868−600)×(5000+12500)=4690000 (J);

If the cold air mixed into the first preheating area is F3=1000 m$^3$/h, and the temperature is 40° C.;

The second branch of flue gas in the first preheating area is F2=5000 m$^3$/h, and the temperature is 1100° C.;

The temperature of the mixed gas at the first dust removal port is 1110° C., and the temperature of the mixed gas in the enhanced preheating area is about 1171° C.;

The thermal equivalent (calculated by the temperature of the first dust removal port) is: (1110−600)×(1000+12500+5000)=9435000 (J);

The thermal efficiency in the enhanced preheating area is increased by: (9435000−4690000)/4690000=100%.

The main reasons for the increase in thermal efficiency are that: 1) the heat taken away by the cold air is reduced, and 2) the heat exchange effect of the branch of hot flue gas is improved.

The above is just an analytical example illustrating the significant effect of mixed cold air on the preheating efficiency of the heat taken away by the cold air. This is similar to the working principle that the heat taken away by nitrogen in the air is reduced by pure oxygen combustion so that combustion temperature and thermal efficiency are increased. In actual use, the burners 6 can be adjusted to reduce the fuel consumption of the burners while meeting the preheating requirements of the working conditions.

The design of the continuous feeding preheating device and flue gas flow field for steel scrap can better increase the combustion efficiency of external chemical energy in the enhanced preheating area, and can also increase the thermal efficiency of the whole system.

If there is a requirement for inhibiting the preheating of dioxin in steel scrap preheating process, a flue gas temperature detector can be arranged at a position required by the system; generally, it is required that both the flue gas temperature of the first dust removal port 3 and that of the second dust removal port 4 are higher than 800° C. (e.g. 850° C.-950° C.); at this point, more heat is taken away by the mixed cold air (the cold air is heated to a higher temperature), which has a greater effect on the thermal efficiency of the burners 6.

An enhanced preheating method based on the above horizontal continuous feeding preheating device, comprising that the material in the second preheating area II is preheated by the total flue gas F0 discharged from the electric arc furnace 2; the total flue gas F0 is divided into a first branch of flue gas F1 and a second branch of flue gas F2 by the first dust removal port 3 and the second dust removal port 4 arranged at intervals, F1 is extracted by the second dust removal port 4, and the material in the first preheating area is preheated by F2 when F2 passes through the first preheating area; the first preheating area is provided with the burners 6 injecting combustion gas F4 into the first preheating area, and F2 is driven by the flame efflux of the burners 6 to penetrate the gaps of the material layer together;

and the cold air F3, the burner combustion gas F4 and the second branch of flue gas F2 entering from the sealed feed inlet 5 are extracted by the first dust removal port 3.

Specifically, the first dust removal port 3 is the main extraction port of the combustion gas F4 injected by the burners, and the second dust removal port 4 is the main extraction port of the first branch of flue gas F1; the second branch of flue gas F2 is driven by the flame efflux of the burners 6 to penetrate the gaps of the steel scrap layer together; the efflux horizontal component of the plurality rows of burners 6 in the enhanced preheating area is directed to the first dust removal port, composing the driving pressure P0 in the duct of the first preheating area, so as to balance the negative pressure P2 of the second dust removal port; the micro-negative pressure requirement of the first dust removal port is controlled by the flue gas pressure sensor 13, so as to reduce the cold air F3 mixed into the first dust removal port, and cut off the cold air F3 entering the enhanced preheating area. Steel scrap entering the flue gas preheating area is preheated once again jointly by the first branch of flue gas F1 and the burners 7 and enters the electric arc furnace 2, therefore the whole step increases the preheating efficiency of the burners, the burners and the electric arc furnace flue gas, and enhances the preheating of steel scrap.

Further, the distribution ratio of flue gas flowing through the mixed flue gas pipeline 8 and the hot flue gas pipeline 9 can be adjusted by the flue gas adjusting distributor 11 or the control valves 14 respectively, so as to control the flow rates of F1 and F2 and the temperature of the mixed flue gas (F2+F3+F4) entering the mixed flue gas pipeline 8, thereby realizing more environment-friendly production.

Finally, it should be noted that the above preferred embodiments are only used for describing, rather than limiting the technical solution of the present invention. Although the present invention is already described in detail through the above preferred embodiments, those skilled in the art shall understand that various changes in form and detail can be made to the present invention without departing from the scope defined by claims of the present invention.

The invention claimed is:

1. A horizontal continuous feeding preheating device, comprising a horizontal continuous feeding preheating duct and an electric arc furnace, and wherein the horizontal continuous feeding preheating duct is provided with a first dust removal port and a second dust removal port at an interval along the material conveying direction, the first dust removal port is located behind a sealed feed inlet of the horizontal continuous feeding preheating duct and close to the sealed feed inlet, the second dust removal port is located at a rear section of the horizontal continuous feeding preheating duct and close to the feed inlet of the electric arc furnace; the first dust removal port is connected with a mixed flue gas pipeline, and the second dust removal port is connected with a hot flue gas pipeline; the mixed flue gas pipeline and the hot flue gas pipeline are connected with the settling chamber by a flue gas adjusting distributor and a flue; a first preheating area is formed by the horizontal continuous feeding preheating duct between the two dust removal ports, and a second preheating area is formed by the horizontal continuous feeding preheating duct between the second dust removal port and the feed inlet of the electric arc furnace; duct height of the first preheating area of the horizontal continuous feeding preheating duct is less than that of the second preheating area; the device includes a plurality of burners I obliquely installed in the first preheating zone and a plurality of burners II obliquely installed in the second preheating zone, wherein horizontal components of direction of combustion air flow of each burner I and each burner II are opposite to material conveying direction; the first dust removal port is set to ensure a constant negative pressure P1, and the second dust removal port is set to ensure a constant negative pressure P2.

2. The horizontal continuous feeding preheating device according to claim 1 further comprises a flue gas quench device connected with the settling chamber.

3. The horizontal continuous feeding preheating device according to claim 1 further comprises a steel scrap feeding magnetic disk crane, and material is conveyed to the material receiving section of the horizontal continuous feeding preheating duct by the steel scrap feeding magnetic disk crane or a vibrating feeding device.

4. The horizontal continuous feeding preheating device according to claim 1, wherein the first dust removal port is connected with a mixed flue gas pipeline, and the second dust removal port is connected with a hot flue gas pipeline; and both the mixed flue gas pipeline and the hot flue gas pipeline are connected with a settling chamber.

5. The horizontal continuous feeding preheating device according to claim 1, wherein the first dust removal port is connected with a mixed flue gas pipeline, and the second dust removal port is connected with a hot flue gas pipeline; and both the mixed flue gas pipeline and the hot flue gas pipeline are connected with a settling chamber.

\* \* \* \* \*